United States Patent
Latifi et al.

(10) Patent No.: US 12,475,761 B2
(45) Date of Patent: Nov. 18, 2025

(54) VIDEO LOTTERY TERMINAL GAMES DESIGNED FOR VISUALLY IMPAIRED PLAYERS

(71) Applicant: IGT, Las Vegas, NV (US)

(72) Inventors: Soheil Latifi, Moncton (CA); Stefan Keilwert, St. Josef (AT); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 211 days.

(21) Appl. No.: 18/195,569

(22) Filed: May 10, 2023

(65) Prior Publication Data

US 2024/0378950 A1 Nov. 14, 2024

(51) Int. Cl.
| | |
|---|---|
| *G07F 17/32* | (2006.01) |
| *G06N 7/01* | (2023.01) |
| *G06N 20/00* | (2019.01) |
| *G09B 21/00* | (2006.01) |

(52) U.S. Cl.
CPC ........... *G07F 17/3227* (2013.01); *G06N 7/01* (2023.01); *G06N 20/00* (2019.01); *G07F 17/3213* (2013.01); *G07F 17/3237* (2013.01); *G09B 21/007* (2013.01); *G07F 17/329* (2013.01)

(58) Field of Classification Search
CPC ............. G07F 17/3227; G07F 17/3213; G07F 17/3237; G07F 17/329; G06N 7/01; G06N 20/00; G09B 21/007
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 11,534,600 B2 | 12/2022 | Simon et al. | |
| 11,558,617 B2 | 1/2023 | Jiang et al. | |
| 11,562,287 B2 | 1/2023 | Xiong et al. | |
| 11,565,185 B2 | 1/2023 | Pourabolghasem et al. | |
| 11,580,425 B2 | 2/2023 | Wang et al. | |
| 2023/0010664 A1 | 1/2023 | Zhang et al. | |
| 2023/0024836 A1 | 1/2023 | Bennett et al. | |
| 2023/0037632 A1 | 2/2023 | Liu et al. | |

OTHER PUBLICATIONS

U.S. Appl. No. 17/748,848, filed May 19, 2022, Russ et al.
(Continued)

*Primary Examiner* — Kevin Y Kim
(74) *Attorney, Agent, or Firm* — Sheridan Ross P.C.

(57) ABSTRACT

The present disclosure relates generally to a gaming system, device, and method supportive of a self-evolving, AI-based player and other behaviors. The gaming system, device, and method receive audio information associated with a current game state of a game during a gaming session; predict a game state based on the audio information; compare the predicted game state with the current game state to determine a set of differences between the predicted game state and the current game state; based on the determined set of differences, select, from a plurality of possible sets of modifications, a set of modifications to an audio output of a game in a gaming session; modify the audio output of the game in accordance with the selected set of modifications; and over successive time intervals, iteratively perform the predict, compare, select and modify operations to provide a game model substantially minimizing the determined set of differences.

20 Claims, 6 Drawing Sheets

(56) References Cited

OTHER PUBLICATIONS

"Haptic technology," Wikipedia, updated Mar. 13, 2023, 15 pages [retrieved online from: en.wikipedia.org/w/index.php?title=Haptic_technology&oldid=1144453344].

"Refreshable braille display," Wikipedia, updated Mar. 2, 2023, 3 pages [retrieved online from: en.wikipedia.org/w/index.php?title=Refreshable_braille_display&oldid=1143698102].

"Reinforcement learning," Wikipedia, updated Feb. 11, 2023, 15 pages [retrieved online from: en.wikipedia.org/w/index.php?title=Reinforcement_learning&oldid=1138703007].

"Reinforcement Learning Tutorial," Javatpoint, as of Feb. 2023, 20pages [retrieved online from: web.archive.org/web/20230205194246/https://www.javatpoint.com/reinforcement-learning].

"What is Reinforcement Learning? Overview of how it Works," Synopsys, 2023, 12 pages [retrieved online from: www.synopsys.com/ai/what-is-reinforcement-learning.html].

CAREW "What is reinforcement learning?" TechTarget, updated Feb. 2023, 6 pages [retrieved online from: www.techtarget.com/searchenterpriseai/definition/reinforcement-learning].

US 12,475,761 B2

VIDEO LOTTERY TERMINAL GAMES DESIGNED FOR VISUALLY IMPAIRED PLAYERS

BACKGROUND

The present disclosure is generally directed toward gaming devices and systems and, more specifically, self-evolving, artificial intelligence (AI)-based player and gaming system behavior models.

Casino models have employed AI to analyze casino floor performance, propose to operators where and how many EGMs to place in their venue, and provide other casino floor performance recommendations.

BRIEF SUMMARY

In certain aspects, the present disclosure relates to a gaming system, device, and method supportive of self-evolving, AI-based player and gaming system behaviors.

In an aspect of the present disclosure, a device includes:
a communication interface;
a display;
a processor coupled with the display and communication interface; and
a computer-readable storage medium coupled with the processor.

The computer-readable storage medium stores data thereon that enables the processor to:
receive audio information associated with a current game state during a gaming session;
predict a game state based on the audio information;
compare the predicted game state with the current game state to determine a set of differences between the predicted game state and the current game state;
based on the determined set of differences, select, from a plurality of possible sets of modifications, a set of modifications to an audio output of a game in the gaming session;
modify the audio output of the game in accordance with the selected set of modifications; and
over successive time intervals, iteratively perform the predict, compare, select and modify operations to provide a game model substantially minimizing the determined set of differences.

In an aspect of the present disclosure, a method includes the steps of:
receiving, by a microphone, audio information associated with a current game state during a gaming session;
predicting, by a processor, a game state based on the audio information;
comparing, by the processor, the predicted display state with a current display state associated with the current game state to determine a set of differences between the predicted display state and the current display state;
based on the determined set of differences, selecting, by the processor from a plurality of possible sets of modifications, a set of modifications to an audio output of a game in the gaming session;
modifying, by the processor, the audio output of the game in accordance with the selected set of modifications; and
over successive time intervals, recursively performing, by the processor, the predicting, comparing, selecting and modifying to provide a game model substantially minimizing the determined set of differences.

In an aspect of the present disclosure, a system includes:
a communication interface;
a display;
one or more speakers;
a processor coupled with the display, one or more speakers, and communication interface; and
a computer-readable storage medium coupled with the processor.

The computer-readable storage medium stores data thereon that enables the processor to:
receive game output information associated with a current game state during a gaming session;
remove game output information associated with a selected player physical impairment to provide modified game output information;
predict a game state based on the modified game output information;
compare the predicted game state with the current game state to determine a set of differences between the predicted game state and the current game state;
based on the determined set of differences, select, from a plurality of possible sets of modifications, a set of modifications to a game output in the gaming session;
modify the game output of the game in accordance with the selected set of modifications; and
over successive time intervals, iteratively perform the receive, remove, predict, compare, select and modify operations to substantially minimize the determined set of differences.

Additional features and advantages are described herein and will be apparent from the following Description and the figures.

DETAILED DESCRIPTION

Figure 1:
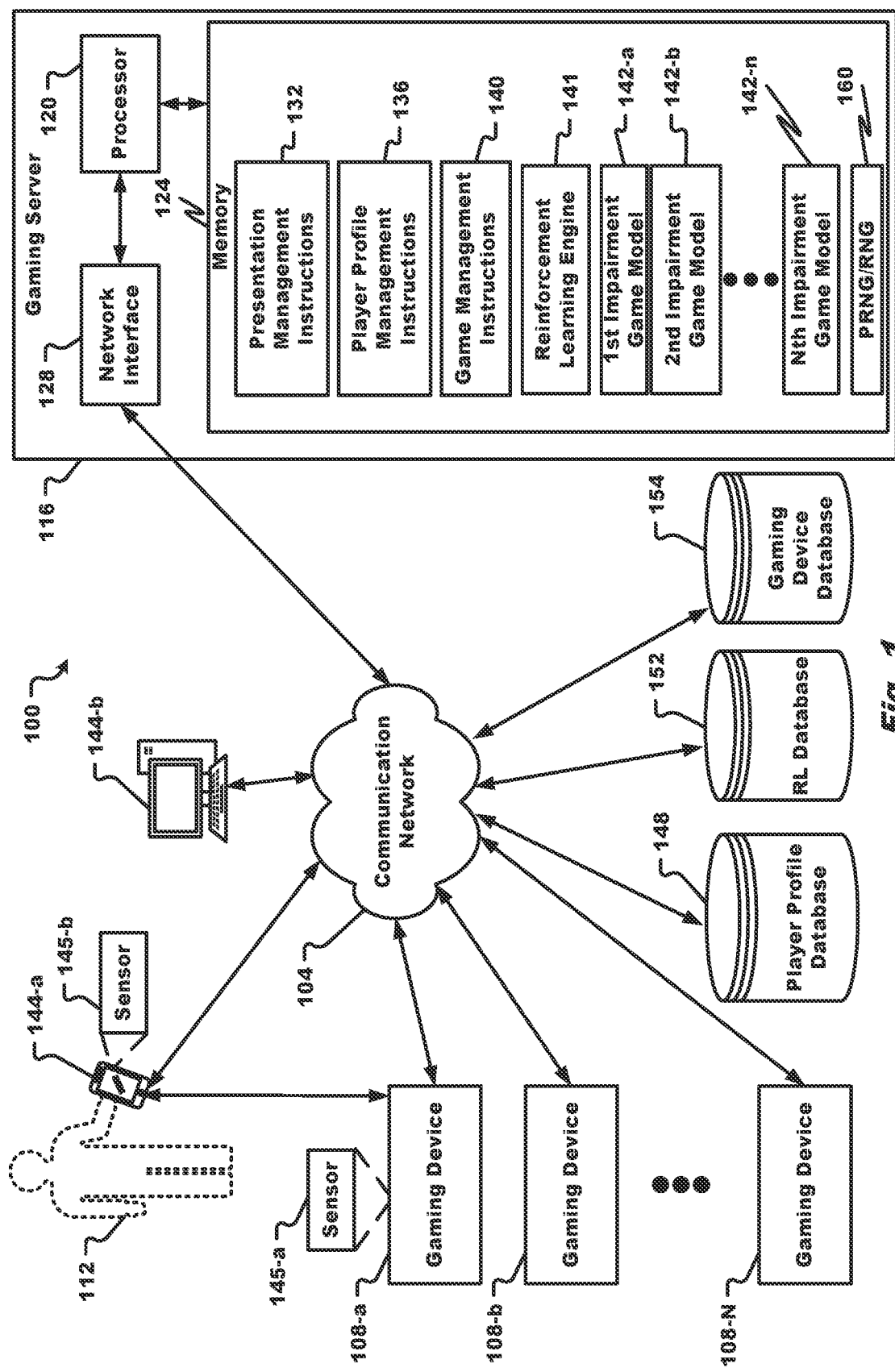
FIG. 1 is a block diagram of a gaming system in accordance with aspects of the present disclosure.

Aspects of the present disclosure will be described in connection with self-evolving, artificial intelligence (AI)-based models (particularly reinforcement learning-based models) in an environment such as, for example, a casino environment. While some examples in the present disclosure may reference the use of an Electronic Gaming Machine (EGM) as a gaming device via which players may participate in gaming activity, it should be appreciated that aspects of the present disclosure are not so limited. For example, any computing device, personal gaming device, or collection of computing devices may be used to facilitate invoking and implementation of the self-evolving AI-based player models disclosed herein.

As described below, aspects of the present disclosure may use a Reinforcement Learning (RL)-based system to provide impairment game models enabling a player having an impairment or disability to interact effectively with a gaming device, such as a Video Lottery Terminal (VLT) gaming device. As will be appreciated, RL uses an intelligent agent, or RL engine, operating in a stochastic environment by selecting and implementing actions within the environment to produce a state and reward or feedback from the selected action and selecting a next action based on a policy or value function. In a model-based approach, a virtual model mimicking the behavior of the environment can be used to predict a next state and reward following a given state and action.

The RL-based system can have full or partial observability. As will be appreciated, full observability refers to the RL-based system directly observing each current state without interference. In contrast, partial observability refers to the RL-based system having access to a subset of states or each of the states but the observed states are corrupted by noise. In the former case, the RL-based system can use a Markov decision process while in the latter case, the RL-based system can use a partially observable Markov decision process. In both cases, the set of modifications or actions available to the agent can be restricted.

In one embodiment, the RL-based system is partially observable and effectively uses only the portion of the game output (e.g., audio output) that can be sensed by the player to develop an impairment game model substantially optimizing such output from the gaming device in predicting game state. The actions can be restricted to a set of modifications to the audio game output. For example, a player having a visual impairment may be unable to view the display of the gaming device but can hear the audio information output by the gaming device. The RL-based system can train an impairment game model that modifies the audio output of the gaming device to enable the player to predict more accurately the displayed game state information e.g., reel configuration on the display (such as occurrence or non-occurrence of payline), jackpot amount, winning outcome, losing outcome, credit meter balance, symbol (such as wild symbol, scatter symbol, etc.) occurrence, bonus award, roll up, and bonus round. Any other game-related information that a player having a selected level of visual impairment can receive can also be made available to the RL-based system as an input. The RL-based system can optimize audio output or existing sounds of a game (effects, music etc.) through real-time audio processing by changing volume or amplitude of sound waves emitted by one or more speakers during the gaming session, a phase of the emitted sound waves, a frequency spectrum of the emitted sound waves, a direction or azimuth of the emitted sound waves), filtering, splitting audio, etc., to better hear and understand "what is going on in a game". In the example, the RL-based system uses a game's audio/sound output as input to determine the status and events in a game. As a result, the RL-based system can understand the game's state, make appropriate decisions, and play the game. For instance, each gaming event can have a corresponding unique soundtrack announcing its occurrence. During spinning of the reel, for instance, the soundtracks act as input for the RL-based system so that a "ding-ding-dong" sound sequence equals a near miss trigger event. In short, the RL-based system mimics a visually impaired player by having full access to the game functions and trying to make sense of and play the game, without seeing the screen. The output of the RL-based system is the state of the game and, when the RL-based system can perfectly predict the state of the game (e.g., symbols on the reels, money in the jackpot, lose streaks etc.), an impairment game model created by the RL-based system is completely functional.

The RL-based system can use only a first portion of the information output in a particular game state of the gaming device to predict the game state while ignoring a second portion of the information output in the particular game state. Alternatively or additionally, the RL-based system can use the first portion of the information output in the particular game state of the gaming device to predict the second portion of the information output in the particular game state. By way of illustration, the RL-based system receives audio information associated with a current game state of a game during a gaming session; predicts a game state (or game display state) based on the audio information; compares the predicted game state (or game display state) with the current game state (or game display state) to determine, as a reward signal, a set of differences between the predicted game state (or game display state) and the current game state (or game display state); based on the determined set of differences, selects, from a plurality of possible sets of modifications, a set of modifications to an audio output of a game in the gaming session (e.g., as the action); modifies the audio output of the game in accordance with the selected set of modifications; and, over successive time intervals or sets of spins, iteratively performs the predict, compare, select and modify operations to provide an impairment game model substantially minimizing the determined set of differences.

The RL-based system can apply the policy function and/or a value function to select the selected set of modifications from among the plurality of possible sets of modifications. The RL-based system can be a model-free or model-based algorithm that uses the reward determined, based on the determined set of differences, to modify a value and/or policy function. Generally, the policy and/or value functions is/are substantially maximized when a determined set of differences between predicted and actual game state is substantially minimized (e.g., the value of the reward signal is substantially maximized).

In one application, the determined set of differences is based on a comparison of a predicted game display state (e.g., the predicted content of the displayed information) with a current game display state (e.g., the actual content of the displayed information). The audio information commonly excludes display information generated by the gaming device in a common game state. In this configuration, a simulated gaming session between the RL-based system and the gaming device can be conducted with the audio information output by the gaming device in a given game state being captured by one or more sensors, such as one or more microphones (such as a condenser microphone, dynamic microphone, carbon microphone, ribbon microphone, or piezoelectric microphone). The captured audio information is converted from analog form to digital form to enable the RL-based system to predict the given game state or game display information generated in the given game state. The received audio information is thus typically unstructured. To emulate a casino environment, the audio information, in analog or digital form, can be combined with unfiltered representative background noise, such as audio output of one or more nearby gaming devices and/or crowd or player noise.

Exemplary sets of modifications that can be implemented by the RL-based system include altering one or more of an amplitude of sound waves emitted by one or more speakers during the gaming session, a phase of the emitted sound waves, a frequency of the emitted sound waves, a direction or azimuth of the emitted sound waves, a color or font size of displayed content, and time lapse between emitting soundtracks of certain co-occurring gaming events to avoid the soundtracks wholly or partially cancelling each other out by mutual interference. For example, the RL-based system can recommend noise output modifications based on other sound characteristics associated with events that were accurately predicted by the RL-based system. For example, the RL-based system can modify the set of sounds associated with bank noise (e.g., coins crashing) to have one or more similar characteristics to another set of sounds associated with an event (e.g., scatter symbol) accurately predicted by the RL engine.

As will be appreciated, the RL engine can be part of or discrete from the impairment game model. In the former case, the RL engine itself is trained while in the latter case the RL engine trains a separate model.

The RL-based system can include a library of impairment game models maintained to accommodate players having different types of impairment or disabilities. The impairment game models can be as simple as a lookup table or ruleset to as complicated as a self-evolving, artificial intelligence (AI)-based model. In one embodiment, the impairment game model is an RL-based model. Accordingly, a first game model can be associated with a first type of visual impairment and a different second game model with a different second type of visual impairment. The first game model is executed by the gaming device processor in a first gaming session with a first visually impaired player and the second game model is executed by the gaming device processor in a second gaming session with a second visually impaired player.

For a given type or level of player impairment, the RL-based system and/or impairment game model can be trained on a variety of game types and/or gaming skills to properly "translate" or universally apply the model to any new type of game. As will be appreciated, different types of games or common game types having different themes frequently share common sounds associated with the same or different types of game events. The modifications applied to a set of sounds for a first type of game can be applied by the RL engine to the same or similar set of sounds for a different second type of game.

In an embodiment instead of using the RL-based system for especially designed games for visually impaired players, a trained model can be flexible so that it can be ported from a "successful game for visually impaired players" onto a "regular game" and make proposals and recommendations on the regular game on how it could easily be transferred into "compatible for visually impaired players". Thus, the RL-based system would review the new game with the original game it was trained on, identify similar mechanisms in both games, and provide a recommendation on the new game, based on how it was solved in the original game. An output of the RL-based system could also be a rating of which game features are the most promising to make the game compatible for visually impaired.

For a given type of game or game theme, the RL-based system can be trained on a first type or level of player impairment and "translated" to a different second type or level of player impairment. As will be appreciated, different types or levels of player impairment can benefit from the same or similar modifications applied to the game output.

To assist the player having the impairment or disability, the modified game output information can be augmented by other types of game output. By way of illustration, the gaming device can include a refreshable electromechanical braille display in which the game state includes a corresponding state of the refreshable electromechanical braille display. By way of further illustration, the gaming device can comprise a passive or active haptic feedback device (with the game state comprising a state of the haptic feedback device). The RL-based system can, for example, be trained on 4D signals such as a blow of winds to the player's face if they hit a jackpot or the machine vibrating when the money is low. The RL-based system can be trained to analyze situations and events in a game and automatically translate those events not only into sound effects but also into braille and/or haptic effects.

In some conventional gaming environments (e.g., casino environments), an EGM may include a player behavior model (e.g., a gameplay assistant, a gameplay model, a player companion, etc.) which, when activated during a gameplay session at the EGM, may assist the player and/or server as a personalization enabler. However, in some other conventional implementations of player behavior models, the player behaviors are hard-coded and created with either common player traits (e.g., generic behaviors, personalities, etc.) and/or are based upon a relatively limited number of parameters. Such conventional player behavior models generally have a one-size-fits-all approach and do not recognize uniquely different player characteristics let alone player characteristics arising from a disability or impairment.

A technical problem of such conventional player behavior models is their inability to behave "intelligently" (e.g., in more complex gameplay situations) in supporting player impairments. For example, designing VLT games for these players is complex because game designers typically do not share a similar disability or impairment and are therefore unable to design accommodating game features. Therefore, the games must be constantly redesigned and tested so that they can be useable by the targeted players. Conventional player behavior models do not overcome these issues as they are not fed with additional data (e.g., feedback, gameplay data, etc.) and are unable to evolve beyond a base model. In some cases, the player behavior models are incapable of drawing on self-learning implications. Accordingly, players having a disability or impairment are severely disadvantaged in game play and effectively barred from gaming.

A further technical problem of existing player behavior models is how to create, update, maintain and use self-evolving AI-based behavior models for players having differing levels or degrees of impairment or disability to enhance performance of a gaming system for such players. The computational resources required to create, update, and maintain a library of models to accommodate differing disabilities or impairments is computationally challenging and intensive. Training data to create such a library of models is generally unavailable. How to incorporate such models into existing gaming systems to enhance gaming system operation and player enjoyment without undue computational costs and processing latency creates yet another technical problem.

A technical solution provided by aspects of the present disclosure uses RL-based learning techniques to develop impairment game models tailoring gaming device game output information to accommodate different types and/or degrees of player impairments or disabilities. The game output information can include not only audio output information but also visual output information. The RL-based learning system excludes the types of game output information that is otherwise not capable of being sensed or otherwise utilized by the impaired player. For example, to accommodate a player having a visual impairment the RL-based system would exclude or blur displayed game output information from the captured game output information used by the RL intelligent agent. Player behavior can include, for example, gameplay patterns and/or gameplay style of a player in game state predictions. In most such applications, the game output information would be audio game output information alone. The RL intelligent agent uses the audio game output information to predict the game state (e.g., displayed game output information or other set of gaming parameters). The set of differences between the actual game state and the predicted game state is used as the reward signal to the RL intelligent agent. Using a policy function and/or value function, the RL intelligent agent uses the reward signal, prior set of game output set of modifications or actions, and current game state to select a next set of set of modifications to be implemented by the impairment game model. These steps are repeated as necessary (or performed recursively or iteratively) to substantially optimize the reward signal (e.g., substantially minimize the set of differences).

The RL-based system can be without supervision, use unlabeled or unstructured data, and use training data not requiring human player involvement. It acquires training data in the form of experience by interacting with the environment, or gaming device, and observing its response. This set of differences can make the RL-based system computationally feasible in complex environments where it is impractical to separately curate labelled training data that is representative of all the situations that an intelligent agent would encounter. The RL-based system is an effective technical solution in such applications because it generates training data autonomously and integrally into the learning algorithm itself.

For instance, an intelligent reinforcement learning agent can learn the game with only selected features (e.g., directional sounds, symbol specific noises, game state tempo indicators, etc.). In slots to accommodate visually impaired players, the RL-based system can use as the main element of the game, one or more soundtracks to predict the formation and configuration of the reels on the screen. The intensity of each soundtrack, the direction of the sound, and/or the intensity of the music can be balanced so that the model can play the game and understand it fully. These RL-learned game models thus depend heavily on the sound design rather than the visual arts. The intelligent RL agents can help the designer to check how helpful are these features for a visually impaired player to interact with the VLT slots game.

In some aspects, via AI mechanisms, the model may self-evolve during actual gameplay with human players to enhance itself to optimize the gaming experience for players having an impairment. In addition to the models using real-time gameplay data with impaired players to maintain/update/improve model capabilities, the models can provide output to the operator that can be used internally (for in-depth analysis purposes). Aspects of the present disclosure describe example techniques associated with generating such models, example methods of implementing the models in a gameplay environment (e.g., casino environment), examples of modifying the models, and example use-cases thereof.

For example, aspects of the present disclosure support the creation and application of "intelligent," self-learning models. In an example, the models described herein may support learning or evolving based on multiple different input sources (e.g., simulated and real player data and player-related parameters) potentially using other types of self-evolving AI learning techniques, to increase the complexity and range of functionality of the models. For example, the RL-based system can use common sets of modifications over different levels of a common disability or impairment to develop, with minimal or substantially reduced processing resources and computational requirements, a library of customized impairment game models for different types or degrees of disability or impairment. In some applications, customized impairment game models can be developed for individual players having unique types and/or degrees of impairment or disability.

Example aspects of the present disclosure may provide increased gaming experience for players having impairments or disabilities by providing more variety and aiming for more player excitement. In some examples, incorporation of such game models for impaired or disabled players may provide increased player engagement created via utilized player-based gaming, which may support higher revenue (e.g., at a casino venue).

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The gaming system 100 may include a communication network 104 that interconnects and facilitates machine-to-machine communications between one or multiple gaming devices 108 (e.g., any of gaming device 108-a through 108-N) and a gaming server 116. It should be appreciated that the communication network 104 may correspond to one or many communication networks without departing from the scope of the present disclosure. In some embodiments, gaming device 108-a through gaming device 108-N and gaming server(s) 116 may be configured to communicate using various nodes or components of the communication network 104.

The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

In some embodiments, the gaming devices 108 (e.g., gaming device 108-a through gaming device 108-N) may be distributed throughout a single property or premises (e.g., a single casino floor), or the gaming devices 108 (e.g., gaming device 108-a through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-a through gaming device 108-N) may utilize the same or different types of communication protocols to connect with the communication network 104. It should also be appreciated that the gaming devices 108 (e.g., gaming device 108-a through gaming device 108-N) may present the same type of game or different types of games to a player 112. For example, the gaming device 108-a may correspond to a gaming machine that presents a slot game to the player 112, the gaming device 108-b may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-a through gaming device 108-N) may communicate or exchange data with one another via the communication network 104. In some embodiments, one or more of the gaming devices 108 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices in the same property or premises. Thus, one or more gaming devices may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The gaming devices 108 (e.g., gaming device 108-a through gaming device 108-N) may correspond to a type of device that supports interaction by a player 112 in connection with playing games of chance. Examples of a gaming device 108 may include any type of known gaming device such as a Video Lottery Terminal (VLT), EGM, a slot machine, a table game, an electronic table game (e.g., video poker), a skill-based game, etc. In addition to playing games on a gaming device 108, the player 112 may also be allowed to interact with and play games of chance on a communication device 144-a.

The gaming system 100 may support interaction with one or more communication devices 144-a. A communication device 144-a may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device (e.g., communication device 144-b) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gameplay session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gameplay session at the gaming device 108 for the player based on the information provided during the "card in."

The gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data to and retrieve data from a player profile database 148, a ticket/voucher database 152, and/or a gaming device database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the Reinforcement Learning (RL) database 152 or data stored therein may be stored internal to the server 116. Alternatively or additionally, the gaming device database 154 or data stored thereon may be stored internal to the server 116.

The databases described herein (e.g., player profile database 148, RL database 152, gaming device database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., gaming server 116 or a different server), and/or on a cloud server (e.g., gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the gaming server 116. In some other aspects, processors (e.g., co-processors) located at a communication device 144 (e.g., a cellular phone, a smart phone, a tablet, a wearable device, an augmented reality headset, a virtual reality headset, etc.) may be used for offloading the AI processing tasks and/or AI data.

The gaming server 116 may support example aspects described herein of acquiring sensor data associated with a gameplay session using any combination of sensors 145 (e.g., sensor 145-*a*, sensor 145-*b*, etc.) (also referred to herein as sensor devices). The sensors 145 may be implemented at (e.g., integrated in) any combination of gaming devices 108 and/or communication devices 144. In some aspects, the sensors 145 may be standalone devices capable of communicating with any component (e.g., a gaming device 108, a gaming system 100, a database, etc.) of the gaming system 100, for example, via the communication network 104. In some aspects, the sensors 145 may provide the sensor data to a machine learning engine 141, aspects of which are described later herein.

In some aspects, the sensors 145 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 145 may be integrated within a physical interface of a gaming device 108 or a communication device 144. In some cases, the sensors 145 may be integrated at or within a threshold distance of a gaming device 108. For example, the sensors 145 may be integrated with a seat cushion, an arm rest, a seat back, a pull handle, a "spin" button, etc.

In some examples, the sensors 145 may capture game output state information (OS(t)) associated with a state of a game of a gaming session. The game output state information can include soundtracks played by the gaming device (e.g., theme music) and other sound effects associated with game events (e.g., reel state (e.g., stopped or spinning), reel symbol configuration (such as occurrence or non-occurrence of one or more paylines (e.g., visible symbols that are not aligned on the main horizontal may be considered as winning combinations)), game theme, jackpot amount, occurrence of winning or losing outcome, credit meter balance, coin in or coin out events, symbol occurrence (symbol-specific noise such as wild symbol, scatter symbol, etc.), game state tempo indicators, roll up, occurrence of bonus awards (e.g., bonus or free spins, secondary bonus games, etc.), persistent state, award payout, and other gameplay events). The game output state information may also include background noise from gaming sessions of other players playing nearby gaming devices, human speech, and other noises and sound effects unrelated to the gaming device hosting the sensor 145.

Aspects of the present disclosure support providing the sensor data to the Reinforcement Learning (RL) engine 141. The RL engine 141 may use the sensor data to predict game display state or game state in connection with a game of a gaming session. Using the sensor data, for example, the RL engine 141 may determine sets of modifications to the audio output by the gaming device to assist players having a visual impairment in determining the game display or game state.

The illustrative instruction sets that may be stored in memory 124 include, without limitation, a presentation management instruction set 132, a player profile management instruction set 136, game management instruction set 140, and RL engine 141 instruction set. . . . Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the game management instruction set 140, when executed by the processor, may enable the gaming server 116 to control games in gaming sessions of gaming devices (e.g., game events and outcomes). The game management instruction set 140, when executed by the processor 120, may enable the gaming server 116 to manage the various games played by a player 112 at the gaming devices 108 (e.g., gaming device 108-a through gaming device 108-N) and/or a communication device 144 carried by the player 112. For example, any game played by the player 112 at any of the gaming devices 108 and/or communication device 144 may be managed, partially or entirely, by execution of the game management instruction set 140. The game management instruction set 140 may also be configured to track a status of wager events (e.g., non-EGM wager games, sporting events, bingo, keno, lottery, etc.) and whether a player 112 has placed a wager on such events.

In some embodiments, the presentation management instruction set 132, when executed by the processor 120, may enable the gaming server 116 to select and push audio, visual (e.g., display), and sensory output content and commands (e.g., tactile output) to the gaming devices 108 (e.g., gaming device 108-a through gaming device 108-N), etc.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, loyalty reward account balance, loyalty reward eligibility, and/or determine which, if any, tickets/vouchers are associated with a particular player. It should also be appreciated that the player profile management instruction set 136 may be configured to manage player profiles of players that do not have loyalty accounts or any other predetermined player account.

In some aspects, the player profile management instruction set 136, using sensor output and player input, may be configured to observe player interactions to identify and record in a player's profile one or more physical impairments or disabilities. An impairment can refer to any impairment to a player's body structure or function or mental functioning.

The RL engine 141 can be any reinforcement learning engine. The RL engine 141 can apply a policy function and/or a value function to select a set of modifications or actions from among the plurality of possible sets of modifications or actions to modify output of the gaming device to assist players having impairments to identify the current game state. The RL-based system can be a model-free or model-based algorithm that uses the reward determined, based on a determined set of differences between current game state and predicted game state (or between current display state and predicted display state), to modify a value and/or policy function. Generally, the policy and/or value functions is/are substantially maximized when a determined set of differences between predicted and actual game state is substantially minimized (e.g., the value of the reward signal is substantially maximized).

Value-based algorithms consider optimal policy to be a direct result of estimating the value function of every state accurately. Using a recursive algorithm described by the Bellman equation ($V(s)=\max [R(s,a)+\gamma V(s')]$ where $V(s)$ is a value calculated at a particular point, $R(s,a)$ is the reward at a particular state "s" by performing an action "a", $\gamma$ is a discount factor, and $V(s')$ is the value at the prior state), the RL-based system interacts with the environment to sample trajectories of states and rewards. Given enough trajectories, the value function can be estimated. Once the value function is known, discovering the optimal policy can be determined by acting greedily with respect to the value function at every state of the process. Stated differently, an optimal value function is typically the maximum value at a state under any policy.

Exemplary value-based algorithms include State-Action-Reward-State-Action (SARSA) and Q-learning. As will be appreciated, in SARSA a quintuple Q (s, a, r, s', a') is employed, where s is the original game state, a is the original set of modifications, r is the reward observed while following A, and s' and a' are a new set of modifications and game state pair. A new set of modifications and reward are selected using a same policy that determined the original or prior set of modifications.

In Q learning, the RL-based system learns the value function Q (s, a) indicating a quality measure or Q value resulting from implementing action "a" at a particular state "s" and maintains a Q-table or matrix comprising game state and action (e.g., set of modifications implemented for the corresponding game state) pairs with associated Q values to select a next set of modifications based on the Q values. Each Q value represents the quality of each set of modifications at each game state. The Q table is initialized prior to selecting a next set of modifications, the next set of modifications is selected and implemented, the reward is measured, and the Q-table updated accordingly.

In deep Q learning (DQN), neural networks are employed to estimate Q values for each action and state as an alternative to using a Q table. Unlike SARSA, Q learning does not require a maximum reward for a next state for updating the Q value in the table. The neural network may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, a long-short term memory (LSTM) neural network, or the like.

Other reinforcement learning algorithms can be employed, such as Monte Carlo, Q-learning Lambda, SARSA-Lambda, DQN (deep Q network), DDPG (deep deterministic policy gradient), A3C (asynchronous advantage actor-critic algorithm), NAF (Q-learning with normalized advantage functions), TRPO (trust region policy optimization), PPO (proximal policy optimization), TD3 (twin delayed deep deterministic policy gradient), and SAC (soft actor-critic), among others.

In some aspects, the neural network may support various clustering algorithms, such as partitive (or centroidal) or hierarchical clustering, both of which separate data into groups whose members share maximum similarity as defined (typically) by a distance metric. In partitive clustering, clusters are represented by central vectors, distributions, or densities. There are numerous variations of partitive clustering algorithms, but some of the most common techniques include k-means, k-medoids, OPTICS, and affinity propagation. Hierarchical clustering involves creating clusters that have a predetermined ordering from top to bottom and can be either agglomerative (clusters begin as single instances and iteratively aggregate by similarity until all belong to a single group) or divisive (the dataset is gradually partitioned, beginning with all instances and finishing with single instances).

Policy-based algorithms, by contrast, typically directly estimate the optimal policy without modeling a value function. By parameterizing the policy directly using learnable weights, such algorithms render the learning problem into an explicit optimization problem. Like value-based algorithms, the RL-based system samples the trajectories of states and rewards to explicitly improve the policy (whether stationary and/or deterministic) by maximizing the average value function across all states. Stated differently, an optimal policy function (either deterministic or stochastic) is typically the optimal policy for the maximum future rewards without using the value function; that is, the RL-based system tries to apply such a policy that the action performed in each step helps to maximize the future reward. Exemplary policy-based algorithms include Monte Carlo policy gradient and deterministic policy gradient.

Hybrid algorithms, such as actor-critic algorithms, formed by combining the value-based and policy-based approaches can be used. As will be appreciated, other value-based, policy-based, and hybrid algorithms, such as deep Q-networks, finite Markov Decision Process (MDP) (which describes the environment using a tuple (S, A, Pa (s, s'), Ra (s, s')) where "S" is a set of finite environment and agent states, "A" is a set of finite actions, Ra (s, s') is the immediate reward received after transitioning from state "s" to state "s'" due to action a, and Pa (s, s') is the probability of transition at time t from state "s" to state "s'" under action "a"), may be employed depending on the application.

In some aspects, the RL engine 141 may use a data model 142-a (e.g., first, second, Nth impairment game model 142-a, 142-b, . . . 142-n) configured to modify game output commands provided by the presentation management instruction set 132 to a gaming device being played by an impaired player to enable the impaired player to better understand the current game state. The data model can be as simple as a lookup table or a rule set or as complicated as a self-evolving, AI-based software program or algorithm, with an RL engine 141 being typical, to dynamically select output modifications based on previously observed actions and states as discussed in more detail below.

To enable game event selection, the gaming server 116 can include a pseudorandom number generator (PRNG) or random number generator (RNG) 160. The RNG or PRNG generates a sequence of numbers or symbols that cannot be reasonably predicted better than by random chance. RNGs are typically hardware random-number generators (HRNGs) that generate random numbers, wherein each generation is a function of the current value of a physical environment's attribute that is constantly changing in a manner that is practically impossible to model. In contrast, PRNGs generate numbers that only look random but are in fact predetermined and can be reproduced simply by knowing the state of the PRNG.

Additionally, or alternatively, the gaming server 116 (e.g., RL engine 141) may apply learnings from prior policy and/or value functions and impairment game models for one game type (e.g., an electronic table game, a skill-based game, a semi skill-based game, etc.) or type of impairment (e.g., visual, hearing, etc.) to a different game type and/or impairment type. In some aspects, the data model 142 generated and/or trained for the gaming device 108 (e.g., gaming device 108-a) of the first game type may be used by both the gaming device 108 of the first game type and the gaming devices 108 of another game type.

The gaming system 100 may support the use of meta data tags. In an example, a gaming device 108 (or gaming server 116) may use a series of meta data tags to determine which impairment game model(s) 142 are compatible for use with the gaming device 108. For example, the gaming device 108 (or gaming server 116) may determine which impairment game model(s) 142 are compatible for use with a game type implemented at the gaming device 108.

In some aspects, training of the data model(s) 142 described herein may be implemented in real-time (e.g., based on a trigger condition such as a temporal duration, a quantity of completed gameplay decisions, a quantity of gameplay events, etc.). In an example, gameplay data and/or sensor data associated with a completed gameplay session (or collected based on a trigger condition) may be processed locally (e.g., at a gaming device 108) or may be sent and processed at the gaming server 116.

In some examples, an impairment game model 142 trained for one game can be tested to play a different game. In an example, the impairment game model 142 may be used to verify how a model from one game type, player segment, etc. would perform with respect to another game type, player segment, etc. That is, aspects of the present disclosure support techniques for verifying the degree in which the impairment game model 142 could perform across different games (e.g., game types), and/or different players having the same or different types or levels of impairment.

The memory 124 may be configured to store program instructions (instruction sets) that are executable by the processor 120 and provide functionality of an RL engine 141. The memory 124 may also be configured to store data or information that is useable or capable of being called by the instructions stored in memory 124. One example of data that may be stored in memory 124 for use by components thereof is an impairment game model(s) 142.

The RL engine 141 may include a single engine or multiple engines.

Aspects of the present disclosure may be applied to game types other than those associated with gaming devices 108. For example, the gaming system 100 may support application of the RL engine 141 and impairment game models described herein to a sports betting environment. In some aspects, the gaming server 116 (e.g., machine learning engine 141) may support processing any combination of data associated with a sporting event (e.g., athlete performance, athlete performance statistics, team performance, team statistics, previous game results, etc.) and player decisions (e.g., wager amounts, wager parameters, etc.) associated with the sporting event. In some cases, the gaming system 100 may support impairment game models associated with sports wagers such as micro events (e.g., micro-betting).

Figures 2A, 2B, 2C:
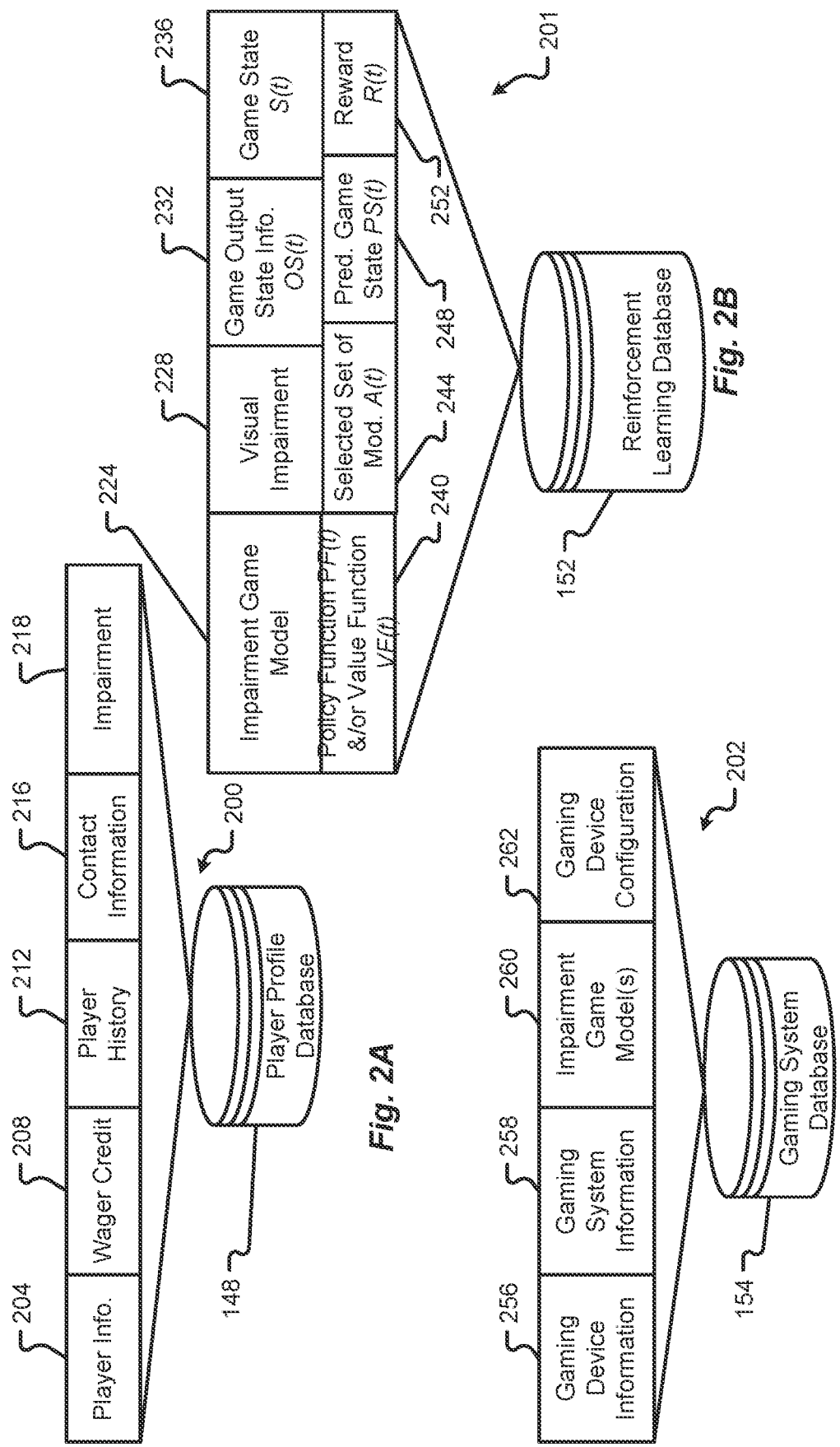
FIG. 2A is a block diagram illustrating a first example data structure used in accordance with aspects of the present disclosure.
FIG. 2B is a block diagram illustrating a second example data structure used in accordance with aspects of the present disclosure.
FIG. 2C is a block diagram illustrating a third example data structure used in accordance with aspects of the present disclosure.

With reference now to FIGS. 2A through 2C, additional details of data structures that are usable in connection with the gaming system 100 will be described in accordance with at least some embodiments of the present disclosure. It should be appreciated that the data structures depicted and described herein may be stored within a central database or may be distributed among a number of data storage nodes.

Alternatively or additionally, some or all of the fields of the data structures may be maintained in devices of the gaming system 100 such as the gaming server 116, a gaming device 108, and/or a communication device 144 without departing from the scope of the present disclosure.

With reference initially to FIG. 2A, details of a data structure 200 that may be maintained as part of a player profile will be described in accordance with at least some embodiments of the present disclosure. The database 148 may be configured to store one or multiple data structures 200 that are used in connection with tracking player progress and gaming history. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, a player history field 212, a contact information field 216, and a player impairment field 218.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about the available credit of a player 112 with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player 112, wagers placed by the player 112, tickets/vouchers issued to the player 112, and the like.

The player history field 212 may be used to store historical data for events that occur with respect to the player 112 (e.g., granular or summarized gameplay data associated with gameplay sessions of the player 112). For example, the player history field 212 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions, player feedback with respect to a baseline player behavior, etc.) with a gaming device 108, wagers placed by the player 112, tickets/vouchers issued for the player 112, tickets/vouchers redeemed by the player 112, etc. In some other examples, the player history field 212 may store granular and/or summarized gameplay data from gameplay sessions of the corresponding player 112.

The contact information field 216 may store information associated with a preferred mode(s) of contact for the player 112 and how such contact can be made. For instance, the contact information field 216 may store information such as an email address, phone number, room number, player loyalty number, address, etc.

The player impairment field 218 may store types and descriptions of player impairments or disabilities. Such impairments or disabilities may be input by the player and/or observed by the gaming system 100 based upon sensor data from gaming sessions involving the player. The type and/or severity of the impairment or disability can be used to select an appropriate impairment game model 142 from the plurality of impairment game models 142-*a*, 142-*b*, . . . 142-*n*. Stated differently, each impairment game model 142 in the library corresponds to a different type of impairment or disability affecting gameplay and/or, when corresponding to a common type of impairment or disability, to a different degree or severity level of the common type of impairment or disability.

With reference now to FIG. 2B, details of another data structure 201 that may be used within the gaming system 100 will be described in accordance with at least some embodiments of the present disclosure. The database 152 may be configured to store one or multiple data structures 201 that are used in connection with the RL-based system discussed herein.

In some embodiments, the data stored in the data structure 201 may be stored for a plurality of different iterations performed by the RL engine 141 on a gaming device to mimic a specific type and level of player impairment.

In an example, the data structure 201 may include a plurality of data fields that include, for instance, an impairment game model 142 field 224, a visual impairment field 228, a game output state information OS(t) field 232, a game display state DS(t) field 236, a policy function PF(t) and/or value function VF(t) field 240, a selected set of modifications A(t) field 244, a predicted game display state PS(t) field 248, and a reward R(t) field 252. It should be appreciated that the data structure 201 may have greater or fewer fields than depicted in FIG. 2B.

The impairment game model field 224 comprises a description of the corresponding model, including the types of games and/or gaming devices with which the corresponding model interacts.

The visual impairment field 228 describes the player impairment as well as the types and/or degrees of player impairment accommodated by the corresponding model. Examples of impairment descriptions include partial or complete loss of vision and partial or complete loss of hearing. Visual impairment can be described qualitatively by a corresponding one of four categories, mild, moderate, severe, or blindness. The visual impairment description can further be described quantitatively as a weighted combination of binocular, right eye, and left eye acuity scores to calculate an acuity-related impairment rating. Visual impairment descriptions can be in other forms, such as color blindness. Color blindness can be described as one of the following types of color blindness: deuteranomaly, protoanomaly, protanopia, and deuteranopia. The RL engine itself can be used to analyze color blindness by cycling through every component of the game (each symbol, each animation, . . . ), associated with all levels of color blindness to identify which components are not 100% compatible to color blind people. The RL engine output could be, for example, that a symbol contains a combination of green and red color that color blind people of type A cannot differentiate" Hearing impairment can be described qualitatively as mild, moderate, severe or deafness. Hearing impairment can further be described quantitatively by a measurement generated by taking the thresholds for four frequencies (500, 1000, 2000, 3000) for each ear and average them, increasing by 1.5% for each dB above 25 dB for each ear, multiplying the better ear by 5 (to weight it more heavily), adding that number with the worse ear and dividing by 6 to get your hearing handicap.

The game output state information field 232 comprises a digital description of a selected portion of the game output information generated in a given game state that is perceptible by the impaired player. The description can include a description of visual, sensory and/or audio information. For visually impaired players, the game output state information field 232 comprises compressed or uncompressed audio information that is described via discrete samples of an analog waveform received by the sensor 145 to create a digital description of the waveform. Each sample comprises an intensity or amplitude of the waveform and the timestamp when sampled. The audio information can further include, for each sample, descriptions of frequency, wavelength, time-period, bandwidth, phase, pitch, duration, timbre, loudness, quality, volume, and an azimuth or direction of the corresponding soundwave relative to a selected point of reference (e.g., sensor location). The game output state information excludes other types of information output by the gaming device in the corresponding state, such as the objects and other content displayed by a display of the gaming device.

The game state S (t) field 236, which can be described as selected portions of the game display state DS(t), describes the corresponding game state. As will be appreciated, any game in a gaming session comprises a sequence of states, where each state is characterized by one or more events, each event being a combination of visual, audio, tactile, and/or animation output. Examples of events associated with a game description include reel state (e.g., stopped or spinning), reel symbol configuration (such as occurrence or non-occurrence of one or more paylines (e.g., visible symbols that are not aligned on the main horizontal may be considered as winning combinations)), game theme, jackpot amount, occurrence of winning or losing outcome, credit meter balance, coin in or coin out events, symbol occurrence (symbol-specific noise such as wild symbol, scatter symbol, etc.), game state tempo indicators, roll up, occurrence of bonus awards (e.g., bonus or free spins, secondary bonus games, etc.), persistent state, award payout, and other gameplay events. In one embodiment, the game display or screen state is described as a series of Boolean variables.

The policy function PF(t) k and/or value function VF(t) field 240 comprises the appropriate function and/or function parameters or variables as currently modified for the corresponding field values. As will be appreciated, each row of the database 152 corresponds to a different set of iterations of the game or gaming session, with the action(s), reward, and state of each iteration being used to modify the parameters or variables of the corresponding function.

The selected set of modifications A(t) field 244 refers to the set of modifications implemented as actions for the corresponding set of iterations. For example for a visually impaired player or a player having a mild hearing impairment, the set of modifications can modify one or more of an intensity or amplitude, frequency, wavelength, time-period, bandwidth, phase, pitch, duration, timbre, loudness, quality, volume, and an azimuth or direction of the waveform output by the gaming device in a selected game state In another example, the selected set of modifications for a player having a color blindness, the set of modifications can modify a color or font size of one or more graphical icons or other objects or text. In another example, the selected set of modifications for a player having a mild visual impairment can modify a font size of one or more graphical icons or other objects or text.

The predicted game state PS(t) field 248 refers to the predicted game or game display state predicted by the RL engine 141 based on the corresponding game output state information OS(t). In the example based on a visually impaired player, the predicted game state PS(t) can refer to the game state (or set of events occurring in the game state) and/or the objects and other content displayed by a display of the gaming device (which objects are associated with or depend upon the set of events occurring in the game state).

The reward R(t) field 252 refers to the reward resulting from the state transition caused by the selected set of modifications. The goal of the RL engine 141 is to learn a policy function and/or value function that maximizes the expected cumulative reward. Stated differently, the purpose of RL is for the RL engine 141 to learn an optimal, or nearly-optimal, policy that maximizes the reward function nor value function or other user-provided reinforcement signal that accumulates from the immediate reward. In one embodiment, the reward R(t) field value is inversely proportional to a set of differences between the game state S (t) and predicted game state PS(t).

In some embodiments, a date/time field (not shown) corresponding to the set of iterations may be included in the data structures. As will be appreciated, the RL engine 141 interacts with the environment (e.g., simulated gaming session with the gaming device) in a series of discrete time steps "t".

With reference to FIG. 2C, details of a data structure 202 that may be maintained as part of a gaming device profile will be described in accordance with at least some embodiments of the present disclosure. The gaming device database 154 may be configured to store one or multiple data structures 202 that are used in connection with the RL engine 141 interaction with a gaming device 108. In some embodiments, the data stored in the data structure 202 may be stored for a plurality of different gaming devices 108 or a single gaming device 108. As a non-limiting example, the data structure 202 may be used to store gaming device information, and the like. Even more specifically, the data structure 202 may include a plurality of data fields that include, for instance, a gaming device information field 256, a gaming system information field 258, an impairment model field 260, and a gaming device configuration field 262.

The gaming device information field 256 may be used to store any type of information that identifies a gaming device 108 or a group of gaming devices 108. In some embodiments, the gaming device information field 256 may store identification information for a gaming device 108 (e.g., a unique serial number assigned to the gaming device 108) and any other type of gaming device management data that may be stored with respect to a gaming device 108.

The gaming system information field 258 may be used to store any type of gameplay and other gaming information including granular and/or summarized gameplay data, gaming system (e.g., casino floor) map showing gaming device location and current usage (e.g., heat map), and the like.

The impairment model field 260 may store descriptions of impairment models that are compatible with the corresponding gaming device identified in the gaming device information field 256. The description may include an link or other electronic address to a corresponding entry in the impairment game model field 224 or otherwise stored at the memory 124 of the gaming server 116 or the gaming device.

The gaming device configuration field 262 may store any configuration descriptions or settings for the corresponding gaming device identified in the gaming device information field 256. Examples include, for slot machines, gaming device type and/or model, the payline configurations, namely horizontal, vertical, oblique, or broken lines; symmetric, transversal lines; triangular, trapezoidal, zigzag, stair, or double-stair lines, payback settings, configuration of the reels (e.g., distribution of the symbols), soundtrack or game theme music, game state and/or game event triggered sounds, display object descriptions, game display configurations for different game events and/or states, and the like. As will be appreciated, other types of gaming devices will contain the same and/or different variables describing the gaming device configuration.

Figure 3:
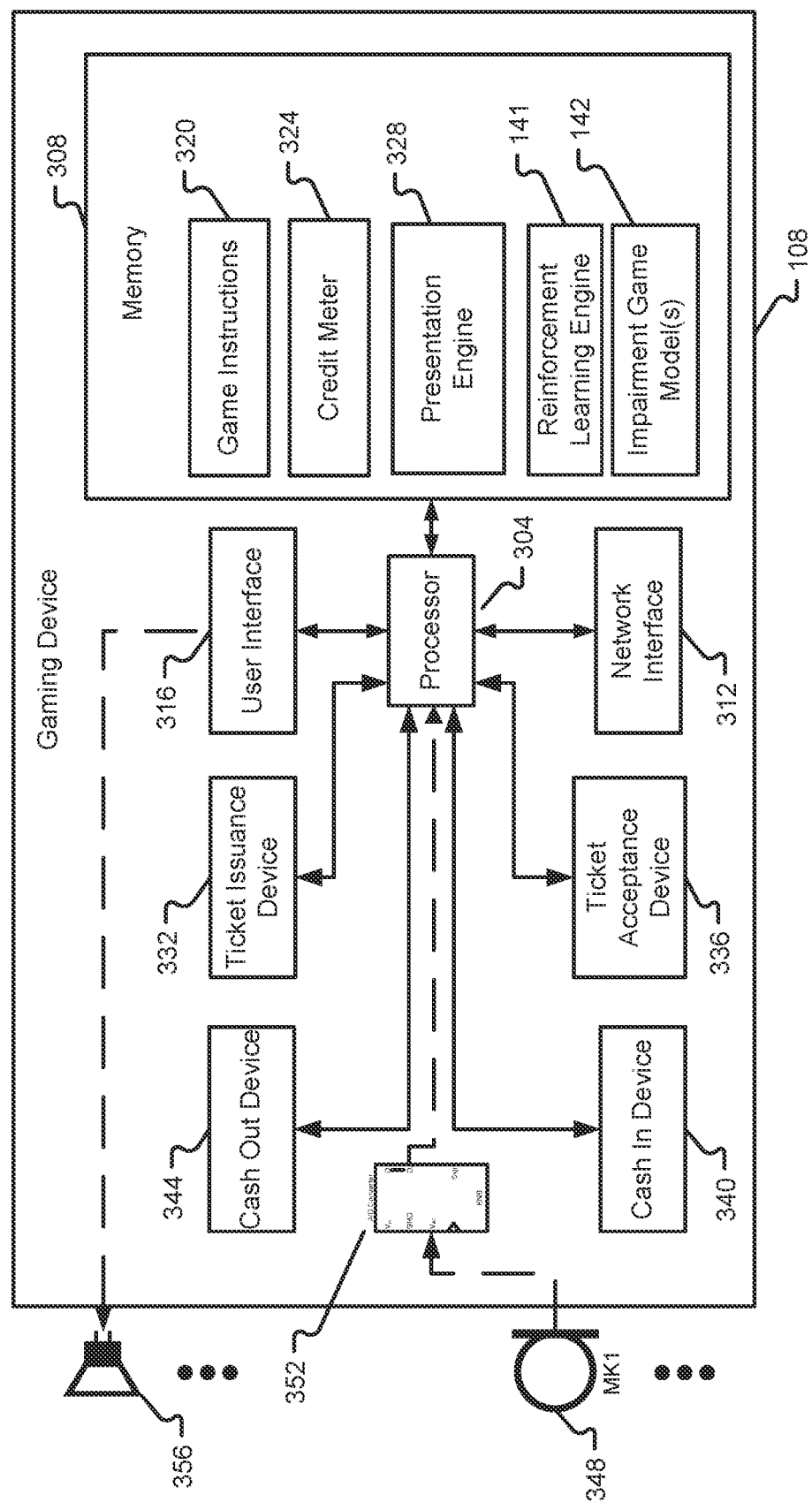
FIG. 3 is a block diagram of a gaming device in accordance with aspects of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a mobile device 144 described herein without departing from the scope of the present disclosure.

The gaming device 108 is depicted to include a processor 304, memory 308, a network interface 312, a user interface 316, a ticket issuance device 332, a ticket acceptance device 336, a cash-in device 340, and a cash out device 344. In an RL learning embodiment, the gaming device 108 comprises one or more optional microphones 348 positioned at selected locations proximal to player seating or standing locations during gameplay (e.g., at or near ear level of an average player during gameplay) to receive audio information output by the gaming device in different game states and an analog-to-digital converter 352 to convert the analog waveforms into digital waveforms. In some embodiments, the processor 304 may include example aspects of the processor 120. In other words, the processor 304 may correspond to one or many microprocessors, CPUs, microcontrollers, or the like. The processor 304 may be configured to execute one or more instruction sets stored in memory 308.

The network interface 312 may include example aspects of network interface 128. The nature of the network interface 312, however, may depend upon whether the network interface 312 is provided in a gaming device 108 or a communication device 144. Examples of a network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle," one or more speakers 356, one or more buttons, or combinations thereof. If the gaming device 108 is a digital device, then the user interface 316 may include one or more touch-sensitive displays, LED/LCD display screens, etc. In some cases, the user interface 316 may include a combination of a physical interface (e.g., mechanical reels, depressible buttons, a lever, etc.) and other user interfaces (e.g., touch-sensitive displays, LED/LCD display screens, etc.). In some cases, the user interface 316 may include a biometric scanning device (e.g., a fingerprint scanner) supportive of biometric inputs by a user. In some examples, the user interface 316 may include any combination of sensors 145 described with reference to FIG. 1 (e.g., an image sensor, an eye tracking sensor, a heart rate sensor, an infrared sensor, an audio sensor, a pulse sensor, an oxygen sensor, a temperature sensor, a pressure sensor, a touch screen sensor, a vibration sensor, a motion sensor, an accelerometer, etc.).

In some examples, one or more speakers 356 and one or more buttons output audio information associated with a game state and the display (not shown) renders content and other display objects associated with the same or common game state. Stated differently, the RL engine can theoretically determine, through trial and error, the displayed content of the display based on analysis of the output audio information and/or the output audio information based on analysis of the displayed content of the display.

In an embodiment, the user interface 316 can include a dynamic braille interface that translates game events (e.g., spin/win/decision events, etc.) into braille equivalents so that game states and be read haptically in addition to being supported via the modified audio output of the one or more speakers 356. For example: the audio output signals or commands to generate the signals can act as a trigger to the gaming device to generate the braille interface configuration and/or to the visually impaired player to read the braille interface. The braille interface can be configured to detect the touch interaction of the finger(s) of the visually impaired player while reading the braille interface. As a result, an impairment model can determine once a finger has touched the braille interface and "understand" by movement of the finger(s) once a braille text equivalent has been read or when the player re-reads the braille text equivalent such as due to lack of understanding. The rate of reading or rereading of the braille text equivalent can cause the RL engine 141 to modify the audio output to assist the visually impaired player to understand the game state. Alternatively or additionally, the braille feedback information can be used by the RL engine 141 and/or impairment model to adapt the braille interface to the reading habits of the player (reading speed, toggling time between messages, size of braille letters, etc.). The braille display can be refreshable, such as an electromechanical device that displays braille characters, usually by means of round-tipped pins raised through holes in a flat surface. The mechanism which raises the dots uses the piezo effect of some crystals, whereby they expand when a voltage is applied to them. Such a crystal is connected to a lever, which in turn raises the dot. There is typically a crystal for each dot of the display (i.e., eight per character). The position of the cursor or other gaming object can be represented by vibrating the dots. Alternatively, a switch associated with each cell can move the cursor or gaming object to that cell directly. The software that controls the display can include a screen reader. It gathers the content of the screen from the operating system, converts it into braille characters, and sends it to the display. A rotating-wheel Braille display can also be used in which braille dots are put on the edge of a spinning wheel, which allows the player to read continuously with a stationary finger while the wheel spins at a selected speed. The braille dots are set in a simple scanning-style fashion as the dots on the wheel spin past a stationary actuator that sets the braille characters.

In an embodiment, the user interface can include advanced haptic feedback via one or more haptic feedback devices that create various haptic effects (varying frequency, duration, sequence of haptic effects) to translate game events and states into haptic effects. Haptic feedback devices can create an experience of touch by applying forces, vibrations, motions, or other sensory feedback to the player. Haptic devices may incorporate tactile sensor(s) that measure forces exerted by the user on the interface. Exemplary haptic devices include one or more motors to manipulate the movement of an item held by the player, air vortex rings configured as donut-shaped air pockets made up of concentrated gusts of air, focused ultrasound beams to create a localized sense of pressure on a finger without touching any physical object (e.g., the focal point that creates the sensation of pressure is generated by individually controlling the phase and intensity of each transducer in an array of ultrasound transducers), and surface haptics (the production of variable forces on a user's finger as it interacts with a surface such as a touchscreen) . . . . A tactile electronic display can be used that delivers text and graphical information using the sense of touch.

The memory 308 may include example aspects of memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter 324, a presentation engine instruction set 328, an optional reinforcement learning engine 141 instruction set 330, and a first impairment game model 142 . . . instruction set 334.

In some embodiments, the game instruction set 320, when executed by the processor 304, may enable the gaming device 108 to facilitate one or more games of chance or skill and produce interactions between the player 112 and the game of chance or skill. In some embodiments, the game instruction set 320 may include subroutines that present one or more graphic and associated audio and haptic feedback to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their communication device 144, and any other subroutine or set of instructions that facilitate gameplay at or in association with the gaming device 108.

The credit meter 324 may correspond to a secure instruction set and/or data structure within the gaming device 108 that facilitates a tracking of activity at the gaming device 108. In some embodiments, the credit meter 324 may be used to store or log information related to various activities of a player 112 and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108.

In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like and provide event or state notifications to the game instruction set 320 to provide graphic and associated audio and haptic feedback information to the player via the user interface 316. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

In some embodiments, the presentation engine instruction set 328, when executed by the processor, acts independently or receives instructions from the presentation management instruction set 132 in the gaming server 116 to render and/or provide audio, visual (e.g., display), haptic, and other sensory output content and commands (e.g., tactile output) to the user interface 316.

The optional reinforcement learning engine instruction set 141, when executed by the processor, trains one or more impairment game model(s) 142 by iteratively or recursively performing the following operations over discrete time intervals (t) during simulated gameplay: selecting and causing the user interface 316 to implement a set of modifications to selected output (e.g., audio output information) associated with a prior game state, causing the gaming device 108 to transition to a next game state, receiving next selected output associated with a next game state, determining a reward associated or derived from a set of differences between a predicted game state based on analysis of the next selected output and the next game state, selecting, based on the reward a next set of modifications followed by repetition of the subsequence operations. The trail-and-error approach can be repeated until an optimal or nearly-optimal policy is learned that maximizes the reward function or other user-provided reinforcement signal that accumulates from the immediate rewards. The impairment game model is modified based on the optimal or nearly-optimal policy to modify the selected output during actual gameplay with an impaired player to facilitate or enhance or enable the player to understand game state.

The gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 336 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/voucher may be accepted by scanning a tag (e.g., an RFID tag, an NFC tag, a contactless smart card, or the like) storing the ticket/voucher information.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324. In some cases, the ticket/voucher may be an e-TITO voucher including a reprogrammable electronic display and an RFID tag.

The cash-in device 340 may include a bill acceptor, a coin acceptor, a chip acceptor or reader, or the like. In some embodiments, the cash-in device 340 may also include credit card reader hardware and/or software. In some aspects, the cash-in device 340 may include one or more machine vision devices (e.g., a camera, IR scanner, optical scanner, barcode scanner, etc.) or non-visual scanning devices (e.g., an RFID reader/writer, an NFC reader/writer).

The cash-out device 344, like the ticket issuance device 322, may operate and issue cash, coins, tokens, or chips based on an amount indicated within the credit meter 324. In some embodiments, the cash-out device 344 may include a coin tray or the like and counting hardware configured to count and distribute an appropriate amount of coins or tokens based on a player's 112 winnings or available credit within the credit meter 324. In some aspects, the cash-out device 344 may include one or more machine vision devices or non-visual scanning devices.

The memory 308 may be configured to store instruction sets, neural networks, and other data structures (e.g., depicted herein) in addition to temporarily storing data for the processor 304 to execute various types of routines or functions. For example, the memory 308 may be configured to store program instructions (instruction sets) that are executable by the processor 304 and provide functionality of an RL engine 141 described herein. The RL engine 141 may include example aspects of the RL-based system described with reference to FIG. 1.

In some aspects, components of the RL engine 141 may be provided in a separate machine learning engine (e.g., at server, for example, the gaming server 116) in communication with the gaming device 108.

Figure 4:
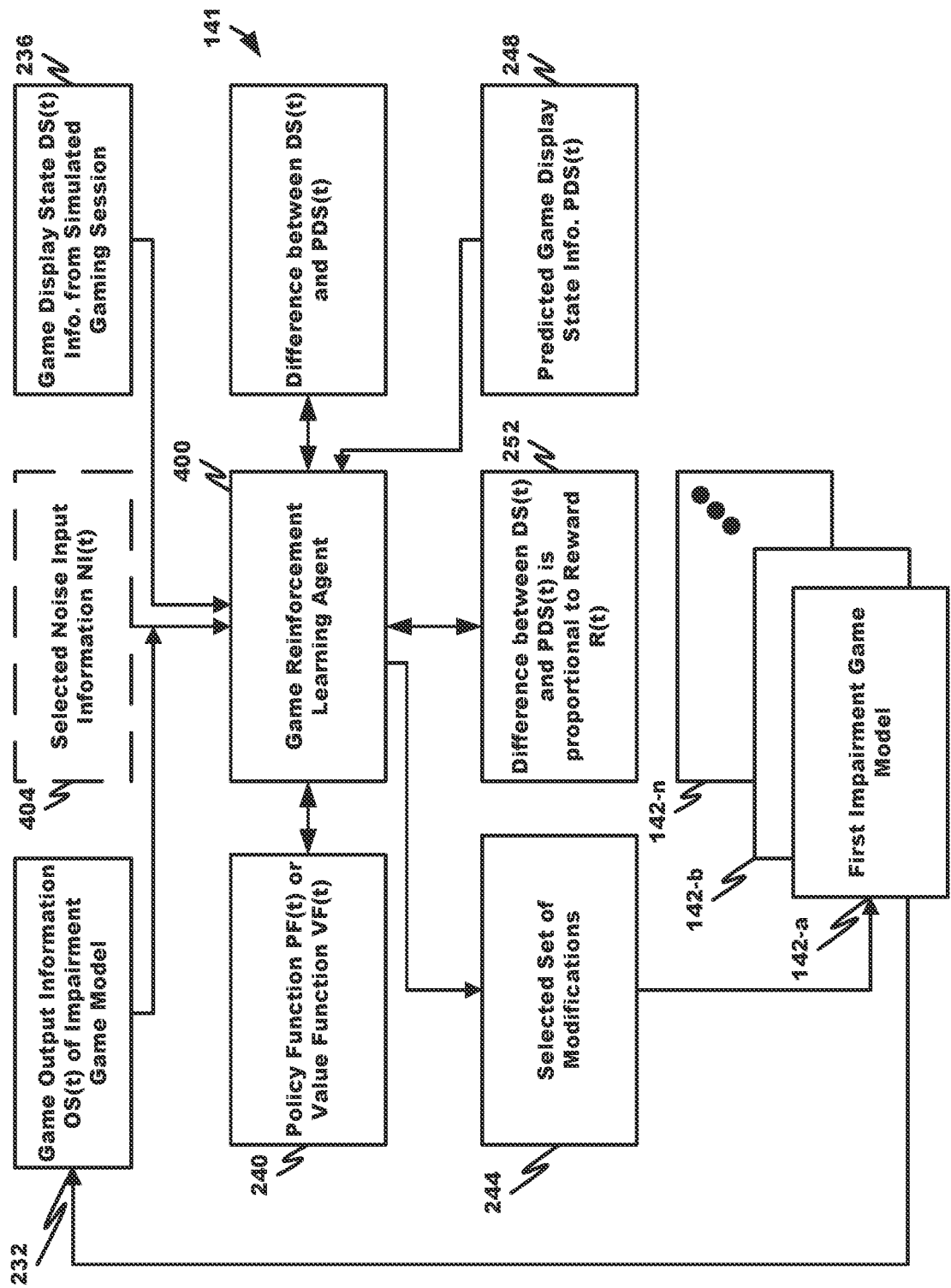
FIG. 4 is a block diagram illustrating a reinforcement learning system in accordance with aspects of the present disclosure.
Figure 5:
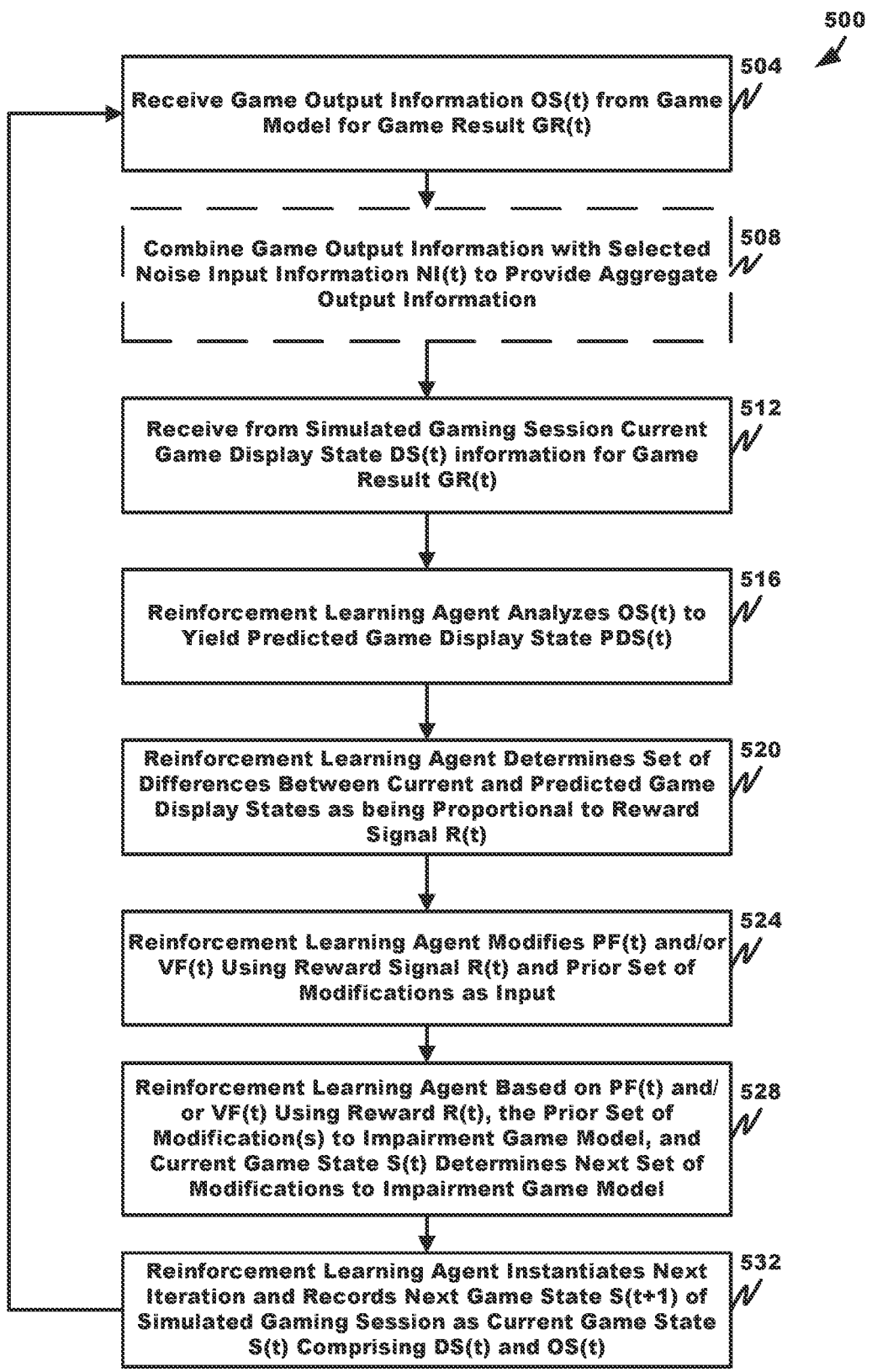
FIG. 5 is a process flow illustrating aspects of a reinforcement learning system in accordance with aspects of the present disclosure.

FIGS. 4-5 depict an example of a process flow 500 and associated operation of the RL engine 141 training first, second, . . . nth impairment game models 142-1 . . . 142-n in a simulated gaming session to emulate behavior of a visually or mildly hearing impaired player. As noted, the RL engine 141 includes a game reinforcement learning agent 400 that performs learning in a trial-and-error manner, with the behavior of the intelligent learning agent 400 being guided based on a reward obtained through interaction with an environment by using an action so as to maximize rewards. The gaming device 108 has the configuration shown in FIG. 3 in which the reinforcement learning engine 141 is in memory 308 and one or more microphones 348 and the analog-to-digital processor are in signal communication with the processor 304 to sense audio output game state information output by one or more speakers 356 and convert the sensed audio output game state information into digital form. In an alternative configuration, the audio output game state information is maintained in digital form before and during RL engine processing.

In the following description of the process flow 500, the operations may be performed in a different order than the order shown, or the operations may be performed in different orders or at different times. Certain operations may also be left out of the process flow 500, or other operations may be added to the process flow 500. It is to be understood that any device (e.g., a gaming device 108, a gaming server 116, a communication device 144, components of the system 100, etc.) may perform the operations shown.

In step 504, the game reinforcement learning agent 400 receives game output information OS(t) in digital form during a game of a simulated gaming session. The game output information comprises a prior set of modifications implanted in a prior iteration of the RL engine 141 by an impairment game model 142 interacting with a presentation engine 328 of the same or different game in the simulated gaming session. For visually impaired players, the game output state information field 232 comprises compressed or uncompressed audio information that is described via discrete samples of an analog waveform received by the sensor 145 to create a digital description of the waveform. Each sample comprises an intensity or amplitude of the waveform at the timestamp when sampled. The audio information can further include, for each sample, descriptions of frequency, wavelength, time-period, bandwidth, phase, pitch, duration, timbre, loudness, quality, volume, and an azimuth or direction of the corresponding soundwave relative to a selected point of reference (e.g., sensor location). The audio output game state information excludes other types of information output by the gaming device in the corresponding state, such as the game display state information.

In step 508, the game output information 232 can optionally be combined with selected noise input information NI(t) 404 to provide aggregate output information for processing by the game reinforcement learning agent 400. The inclusion of the noise input information can cause the learnings of the reinforcement engine 141 to be more robust and accurate in a casino setting.

In step 512, the learning agent 400 further receives game display state DS(t) information from the simulated gaming session as the game state. The game display state information typically comprises objects and other content displayed by a display of the gaming device when in a given state. As will be appreciated, both the game audio output state information and game display state information correspond to a common game state or result GR(t) and therefore analysis of one can predict the other. The game display state information can include object-based (or vector) graphics of a graphic object and/or pixel-based (or raster) graphic of an image or collection of images. In either case, the graphic objects and/or pixel-based images in the game display state information are associated with a set of game events. The game audio output state information comprises audio information that is associated with the same set of game events.

In step 516, the reinforcement learning agent 400 predicts the game display state information based on the game audio state information. In this regard, the reinforcement learning agent 400 emulates the behavior of a visually impaired or mildly hearing impaired player. In contrast, the impairment game model modifies the game output information of the presentation engine to produce an optimal or nearly optimal output information to enable the impaired player to rapidly and accurately understand the game state associated with the game output information.

By way of illustration, the reinforcement learning agent 400 can predict the game display state by pattern matching soundtracks for different gaming events against the game audio state information associated with the game state. Each gaming event (e.g., reel configuration on the display (such as occurrence or non-occurrence of payline), jackpot amount, winning outcome, losing outcome, credit meter balance, symbol (such as wild symbol, scatter symbol, etc.) occurrence, bonus award, roll up, and bonus round, etc.) can have an associated unique soundtrack that acts as an audio "fingerprint". By pattern matching the frequency spectrum of the associated soundtrack for each event against the frequency spectrum of the game audio state information, the presence or absence of each game event can be determined and therefore the game display state predicted.

In step 520, the reinforcement learning agent 400 determines a set of differences between the actual game display state information 236 produced by the game of the simulated gaming session and a predicted game display state information 248 produced by the impairment game model 142. The reward R(t) 252 used by the learning agent 400 in selecting the selected set of modifications 244 is directly or inversely proportional to the set of differences. The set of differences can be calculated in numerous ways. For example, a value can be assigned to each game event in the set of game events. Alternatively, a different value can be assigned to different subsets of game events in the set of game events. In any event, the learning agent 400 performs on an object-by-object comparison of the sets of objects in the game display state information and predicted game display state information. When the predicted game display state information and actual game display state information each contain the game event, the reward value is incremented (positive reinforcement in which the reward is substantially maximized) or decremented (negative reinforcement in which the reward is substantially minimized) by the value assigned to the event include in both the actual and predicted game display state information, and, when the predicted game display state information and actual game display state information do not each contain the game event, the reward value is decremented (positive reinforcement) or incremented (negative reinforcement) by the value assigned to the event omitted from the predicted game display state information.

In step 524, the reinforcement learning agent 400 modifies the policy or value function using the reward signal and the prior set of modifications as input. The policy or value function is a set of behavior rules used by the agent 400 in reinforcement learning. The function 240 is typically a neural network, such as a graph or deep neural network.

In step 528, the reinforcement learning agent 400 selects a next set of modifications to the impairment game model that alters one or more parameter(s) of the audio output based on the modified policy function and/or value function, the reward signal, the prior set of modifications to the impairment game model, and/or current game state. The parameter(s), for example, can be one or more of frequency, wavelength, time-period, bandwidth, phase, pitch, duration, timbre, loudness, quality, volume, and an azimuth or direction of the corresponding soundwave relative to a selected point of reference (e.g., sensor location) for each soundtrack associated with a gaming event in the game display state. In some applications, the set of modifications can include delays or a time lapse between emission of soundtracks of different gaming events in the game state to avoid the soundtracks acting as noise for each other. The is particularly useful where the soundtracks have substantially overlapping frequency spectra. The parameters can be for plural events in the set of events, for each of the events in the set of events, or for any event that may occur in the next iteration of the simulated gaming session. Stated differently, a first event can be subject to a first set of modifications and a second event to a different second set of modifications.

In step 532, the game reinforcement learning agent 400 causes a next set of iterations of the simulated gaming session, records the next game state of the simulated gaming session (comprising DS(t) and OS(t) as the current game state and returns to and repeats step 504.

A next iteration of steps 504-532 is then performed. The above operations repeated until an optimal or nearly optimal policy or value function and impairment game model is realized.

Figure 6:
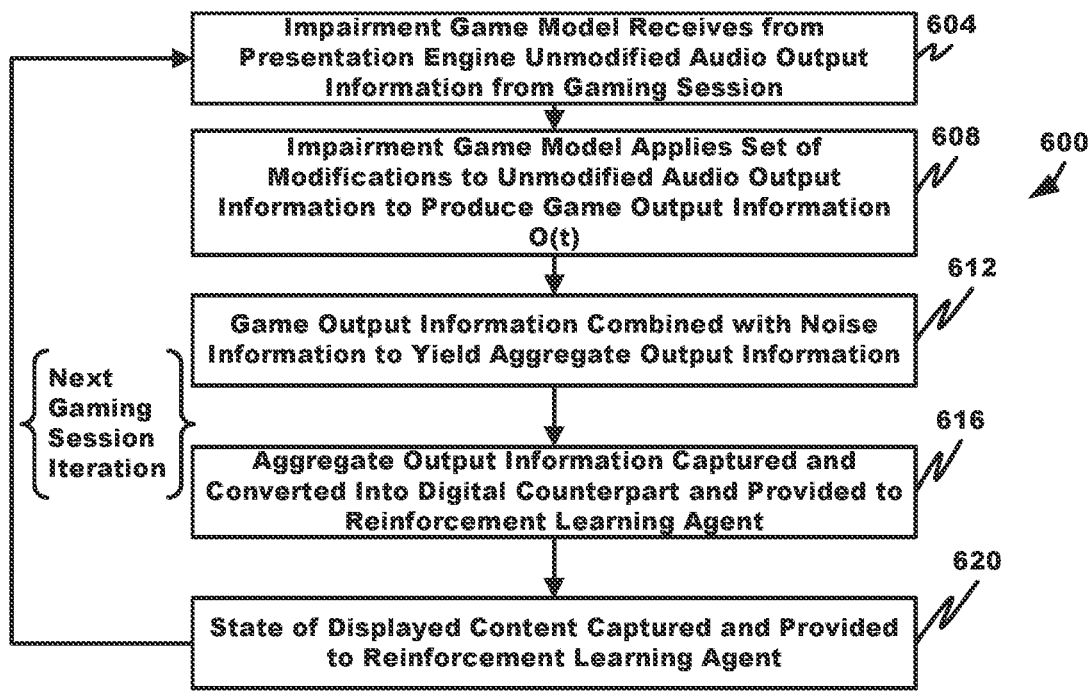
FIG. 6 is a process flow illustrating aspects of a reinforcement learning system in accordance with aspects of the present disclosure.

FIG. 6 illustrates an example of a process flow 600 that supports aspects of the present disclosure associated with impairment game model operation. In some examples, process flow 600 may implement aspects of gaming system 100. Further, process flow 600 may be implemented by a gaming system 100 or components included therein as described with reference to FIGS. 1 through 3.

In the following description of the process flow 600, the operations may be performed in a different order than the order shown, or the operations may be performed in different orders or at different times. Certain operations may also be left out of the process flow 600, or other operations may be added to the process flow 600. It is to be understood that any device (e.g., a gaming device 108, a gaming server 116, a communication device 144, components of the system 100, etc.) may perform the operations shown.

Referring now to FIG. 6, a method of using impairment game model(s) to modify output information of the gaming device 108 during simulated gameplay sessions during RL engine 141 learning will be described in accordance with embodiments of the present disclosure.

The method begins when the impairment game model receives from the presentation engine unmodified audio output information from a simulated gaming session (step 604). The impairment game model applies a set of modifications to the unmodified audio output information to produce game output state information O(t) (step 608). The impairment game model, for example, can map game events in the game state against a lookup table or rule set to modify or replace unmodified output information with modified output information. For example, a scatter symbol's unmodified audio equivalent can be replaced with a modified audio equivalent to assist a visually impaired or mildly hearing impaired player to understand the corresponding game event.

In step 612, the modified game output information is combined with noise information to yield aggregate output information (step 612).

The aggregate output information is captured and converted into a digital counterpart and provided to the reinforcement learning agent (step 616).

The state of the displayed content is captured and provided to the reinforcement learning agent (step 620). A next gaming session iteration is then performed as noted above in connection with FIG. 5.

Figure 7:
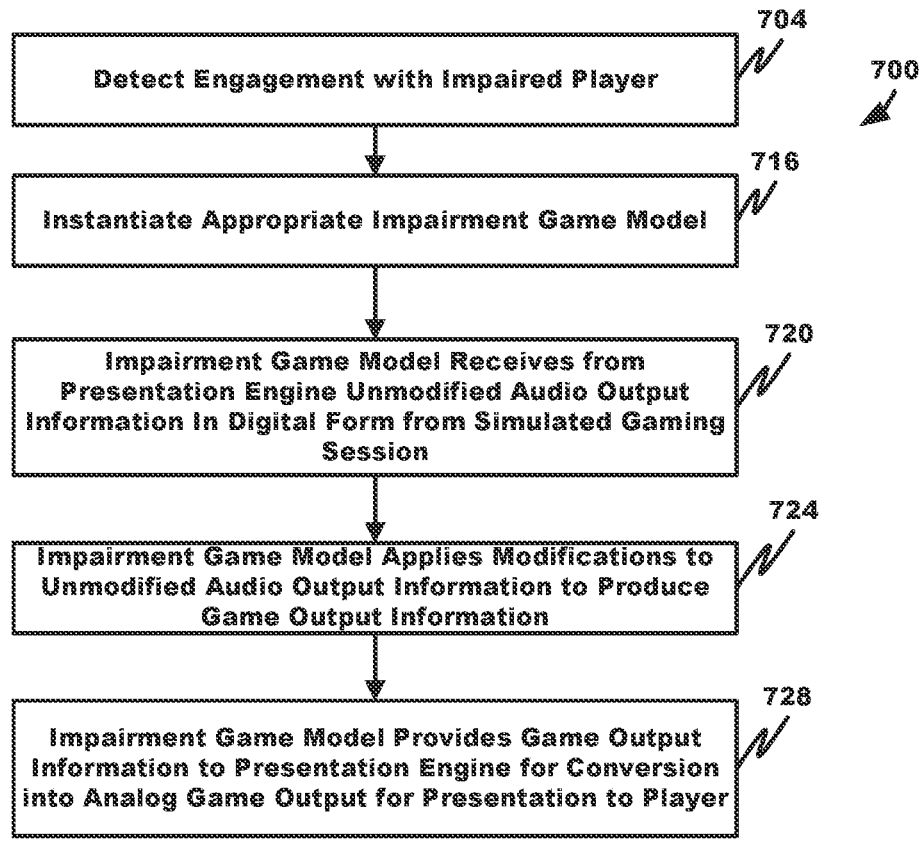
FIG. 7 is a process flow illustrating the interaction of an impairment game model with a gaming device in accordance with aspects of the present disclosure.

FIG. 7 illustrates an example of a process flow 700 that supports aspects of the present disclosure associated with impairment game model selection and operation during a live gaming session with a player having an impairment. In some examples, process flow 700 may implement aspects of gaming system 100. Further, process flow 700 may be implemented by a gaming system 100 or components included therein as described with reference to FIGS. 1 through 3.

In the following description of the process flow 700, the operations may be performed in a different order than the order shown, or the operations may be performed in different orders or at different times. Certain operations may also be left out of the process flow 700, or other operations may be added to the process flow 700. It is to be understood that any device (e.g., a gaming device 108, a gaming server 116, a communication device 144, components of the system 100, etc.) may perform the operations shown.

Referring now to FIG. 7, a method of using impairment game model(s) to modify output information of the gaming device 108 during an actual gameplay session will be described in accordance with embodiments of the present disclosure. The method begins when the gaming system 100 detects engagement with an impaired player (step 704). This may occur by any technique such as when the player 112 cards in or indicates, via the user interface, that the player has a physical impairment (step 704). If games are succeeded for both regular players and visually impaired players, a toggle can be employed to enable switching between the players to switch a "visually impaired mode" on/off. The interface could employ one or more devices (e.g., cameras) to track player card status to automatically identify a visually impaired player and turn the mode on when such a person is sitting down at the gaming device. The player could be prompted regarding whether to enable the "visually impaired mode" with or without a braille interface.

The gaming system 100, in response, selects, based on player input and/or the impairment field 218 of the corresponding player profile, an impairment game model from a library of impairment game models and instantiates the selected impairment game model 260 (step 716). The impairment game model receives from the presentation engine unmodified audio output information from a simulated gaming session (step 720). The impairment game model applies a set of modifications to the unmodified audio output information to produce game output information (step 724). The impairment game model, for example, can map game events in the game state against a lookup table or rule set to modify or replace unmodified output information with modified output information. For example, a scatter symbol's unmodified audio equivalent can be replaced with a modified audio equivalent to assist a visually impaired or mildly hearing impaired player to understand the corresponding game event. The impairment game model provides the output information to the presentation engine for conversion into analog game output for presentation to the player 112 (step 728).

A number of variations and set of modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764, 566, entitled "Internet Remote Game Server," and U.S. Pat. No. 8,147,334, entitled "Universal Game Server."

The central gaming server, central gaming controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A device comprising:
a communication interface;
a display;
a processor coupled with the display and communication interface; and
a computer-readable storage medium coupled with the processor, the computer-readable storage medium storing data thereon that enables the processor to:
receive audio information associated with a current game state during a gaming session;
predict a game state based on the audio information;
compare the predicted game state with the current game state to determine a set of differences between the predicted game state and the current game state;
based on the determined set of differences, select, from a plurality of possible sets of modifications, a set of modifications to an audio output of a game in the gaming session;
modify the audio output of the game in accordance with the selected set of modifications; and
over successive time intervals, iteratively perform the predict, compare, select and modify operations to provide a game model minimizing the determined set of differences.

2. The device of claim 1, wherein the game comprises slots, wherein the game state comprises a configuration of one or more reels on the display, wherein the successive time intervals comprise multiple spins of reels, wherein the processor determines, based on the determined set of differences, a reward and, based on the reward, modifies a policy function, wherein the processor applies the policy function to select the selected set of modifications from among the plurality of possible sets of modifications; and wherein the policy function is maximized when the determined set of differences is minimized.

3. The device of claim 1, wherein the audio information excludes display information regarding a state of a game display, wherein the determined set of differences is based on a comparison of a predicted game display with a current game display, and wherein the set of modifications comprises altering one or more of an amplitude of sound waves emitted by one or more speakers during the gaming session, a direction of the emitted sound waves, a phase of the emitted sound waves, a frequency of the emitted sound waves, and an azimuth of the emitted sound waves.

4. The device of claim 2, wherein the processor uses a Markov decision process in selecting, from a plurality of possible sets of modifications, a set of modifications to an audio output of a game in a gaming session, wherein the policy function comprises neural network algorithm, wherein the audio information is received by one or more microphones and converted from analog form to digital form before predicting the game state, wherein a first game model is associated with a first type of visual impairment and a different second game model is associated with a different second type of visual impairment, and wherein the first game model is executed by the processor in a first gaming session with a first visually impaired player and the second game model is executed by the processor in a second gaming session with a second visually impaired player.

5. The device of claim 1, wherein the received audio information is unstructured, wherein the audio information comprises unfiltered background noise to replicate a casino environment, and wherein the game state comprises occurrence of a reel configuration on the display, jackpot amount, winning outcome, losing outcome, credit meter balance, symbol occurrence, bonus award, roll up, and bonus round.

6. The device of claim 1, wherein the game model emulates behavior of a visually impaired player, wherein the selected set of modifications comprises altering a color or font size of displayed content, and further comprising a refreshable electromechanical braille display, wherein the game state comprises a state of the refreshable electromechanical braille display.

7. The device of claim 1, wherein, during a subsequent gaming session with a visually impaired player, the game model, in response to player input and/or a player profile, causes the processor to implement the selected set of modifications in audio information output by a gaming device and further comprising a haptic feedback device, wherein the game state comprises a state of the haptic feedback device.

8. A method comprising:
receiving, by a microphone, audio information associated with a current game state during a gaming session;
predicting, by a processor, a display state based on the audio information;
comparing, by the processor, the predicted display state with a current display state associated with the current game state to determine a set of differences between the predicted display state and the current display state;
based on the determined set of differences, selecting, by the processor from a plurality of possible sets of modifications, a set of modifications to an audio output of a game in the gaming session;
modifying, by the processor, the audio output of the game in accordance with the selected set of modifications; and
over successive time intervals, recursively performing, by the processor, the predicting, comparing, selecting and modifying to provide a game model minimizing the determined set of differences.

9. The method of claim 8, wherein the game comprises slots, wherein the display state is associated with a game state, wherein the game state comprises a configuration of one or more reels on a display, wherein the successive time intervals comprise multiple spins of reels and further comprising:
determining, by the processor based on the determined set of differences, a reward; and
based on the reward, modifying, by the processor, a policy function, wherein the processor applies the policy function to select the selected set of modifications from among the plurality of possible sets of modifications; and wherein the policy function is maximized when the determined set of differences is minimized.

10. The method of claim 8, wherein the audio information excludes display information regarding a state of a game display, wherein the determined set of differences is based on a comparison of a predicted game display with a current game display, and wherein the selected set of modifications comprises altering one or more of an amplitude of sound waves emitted by one or more speakers during the gaming session, a direction of the emitted sound waves, a phase of the emitted sound waves, a frequency of the emitted sound waves, and an azimuth of the emitted sound waves.

11. The method of claim 10, wherein the display state is associated with a game state, wherein the received audio information is unstructured, wherein the processor uses a Markov decision process in selecting, from a plurality of possible sets of modifications, a set of modifications to an audio output of a game in a gaming session, wherein a policy function comprises neural network algorithm, wherein the state of the game comprises occurrence of a reel configuration on the game display, jackpot amount, winning outcome, losing outcome, credit meter balance, symbol occurrence, bonus award, roll up, and bonus round, and further comprising:
converting from analog form to digital form before predicting the game state.

12. The method of claim 8, wherein the audio information comprises unfiltered background noise to replicate a casino environment, wherein a first game model is associated with a first type of visual impairment and a different second game model is associated with a different second type of visual impairment, and further comprising:
at a first time, executing, by the processor, the first game model in a first gaming session with a first visually impaired player; and
at a second time, executing, by the processor, the second game model in a second gaming session with a second visually impaired player.

13. The method of claim 8, wherein the game model emulates behavior of a visually impaired player, wherein the selected set of modifications comprises altering a color or font size of displayed content, and further comprising:
refreshing an electromechanical braille display based on events in the gaming session, wherein the current game state comprises a state of the electromechanical braille display.

14. The method of claim 8, further comprising:
wherein, during a subsequent gaming session with a visually impaired player, executing the game model, in response to player input and/or a player profile, to implement the selected set of modifications in audio information output by a gaming device; and
activating a haptic feedback device based on events in the gaming session, wherein the current game state comprises a state of the haptic feedback device.

15. A system comprising:
a communication interface;
a display;
one or more speakers;
a processor coupled with the display, one or more speakers, and communication interface; and
a computer-readable storage medium coupled with the processor, the computer-readable storage medium storing data thereon that enables the processor to:
receive game output information associated with a current game state of a game during a gaming session;
remove game output information associated with a selected player physical impairment to provide modified game output information;
predict a game state based on the modified game output information;
compare the predicted game state with the current game state to determine a set of differences between the predicted game state and the current game state;
based on the determined set of differences, select, from a plurality of possible sets of modifications, a set of modifications to a game output in the gaming session;
modify the game output of the game in accordance with the selected set of modifications; and
over successive time intervals, iteratively perform the receive, remove, predict, compare, select and modify operations to substantially minimize the determined set of differences.

16. The system of claim 15, wherein the game comprises slots, wherein the game state comprises a configuration of one or more reels on the display, wherein the successive time intervals comprise multiple spins of reels, wherein the processor determines, based on the determined set of differences, a reward and, based on the reward, modifies a policy function, wherein the processor applies the policy function to select the selected set of modifications from among the plurality of possible sets of modifications; and wherein the policy function is maximized when the determined set of differences is minimized.

17. The system of claim 15, wherein the game output information comprises audio information and excludes display information regarding a state of a game display, wherein the determined set of differences is based on a comparison of a predicted game display with a current game display, and wherein the set of modifications comprises altering one or more of an amplitude of sound waves emitted by one or more speakers during the gaming session, a direction of the emitted sound waves, a phase of the emitted sound waves, a frequency of the emitted sound waves, and an azimuth of the emitted sound waves.

18. The system of claim 15, wherein the game output information comprises audio information and first display information regarding a state of a game display but excludes second display information regarding the state of the game display, wherein the first and second display information comprises discrete color spectrum wavelengths, wherein the determined set of differences is based on a comparison of a predicted game display with a current game display, and wherein the set of modifications comprises altering one or more of an amplitude of sound waves emitted by one or more speakers during the gaming session, a direction of the emitted sound waves, a phase of the emitted sound waves, a frequency of the emitted sound waves, an azimuth of the emitted sound waves, and a color spectrum wavelength of the second display information.

19. The system of claim 15, wherein the stored data comprises a game model that emulates behavior of a visually impaired player, and wherein the selected set of modifications comprises altering a color or font size of displayed content.

20. The system of claim 15, wherein the game output information comprises unfiltered background noise to replicate a casino environment, wherein a first game model is associated with a first type of visual impairment and a different second game model is associated with a different second type of visual impairment, and further comprising:
at a first time, executing, by the processor, the first game model in a first gaming session with a first visually impaired player; and
at a second time, executing, by the processor, the second game model in a second gaming session with a second visually impaired player.

* * * * *